United States Patent
Rossini

(10) Patent No.: US 7,855,787 B2
(45) Date of Patent: Dec. 21, 2010

(54) METHOD OF DETERMINING THE PRETILT ANGLE IN A LIQUID-CRYSTAL CELL

(75) Inventor: Umberto Rossini, Coublevie (FR)

(73) Assignee: Thales, Neuilly sur Seine (FR)

( * ) Notice: Subject to any disclaimer, the term of this patent is extended or adjusted under 35 U.S.C. 154(b) by 1 day.

(21) Appl. No.: 12/516,428

(22) PCT Filed: Nov. 20, 2007

(86) PCT No.: PCT/EP2007/062561

§ 371 (c)(1),
(2), (4) Date: Jun. 30, 2009

(87) PCT Pub. No.: WO2008/065025

PCT Pub. Date: Jun. 5, 2008

(65) Prior Publication Data

US 2010/0045992 A1    Feb. 25, 2010

(30) Foreign Application Priority Data

Nov. 28, 2006   (FR)   ................................. 06 10401

(51) Int. Cl.
*G01N 21/00*  (2006.01)
*G02F 1/1335* (2006.01)

(52) U.S. Cl. ..................................... 356/433; 349/118

(58) Field of Classification Search ......... 356/432–436, 356/630, 367; 439/117–118, 202, 212; 359/40, 359/53, 73, 77

See application file for complete search history.

(56) References Cited

U.S. PATENT DOCUMENTS 5,017,827 A    5/1991   Rossini et al.

(Continued)

FOREIGN PATENT DOCUMENTS

EP        1 273 881      1/2003

OTHER PUBLICATIONS

Kawamura, M. et al., "A Two-Dimensional Pretilt Angle Distribution Measurement of Twisted Nematic Liquid Crystal Cells Using Stokes Parameters at Plural Wavelengths", Japanese Journal of Applied Physics, vol. 43, No. 2, pp. 709-714, XP002443517, (2004).

(Continued)

*Primary Examiner*—Sang Nguyen
(74) *Attorney, Agent, or Firm*—Oblon, Spivak, McClelland, Maier & Neustadt, L.L.P.

(57) ABSTRACT

To determine the tilt angle in a twisted nematic liquid-crystal cell, the transmission of the cell is calculated as a function of the angle of incidence of a light beam of given wavelength λ using apparent values of the thickness of the cell cavity, of the extraordinary index and of the twist angle, in order to obtain a plurality of simulation curves, one per given pretilt angle, the transmission curve is measured as a function of the angle of incidence of the cell along the axis passing through the top and bottom positions of the cell, for the light beam of wavelength λ, using a contrast meter, and the coincidence between this measurement curve and a curve from among the plurality of simulation curves gives the pretilt angle of this cell.

9 Claims, 6 Drawing Sheets

U.S. PATENT DOCUMENTS

| | | | | |
|---|---|---|---|---|
| 5,239,365 | A | * | 8/1993 | Inoue .......................... 356/367 |
| 5,493,426 | A | * | 2/1996 | Johnson et al. ............... 349/74 |
| 5,552,912 | A | * | 9/1996 | Sharp et al. ................. 349/117 |
| 5,585,950 | A | * | 12/1996 | Nishino et al. ............. 349/118 |
| 5,825,448 | A | * | 10/1998 | Bos et al. .................... 349/128 |
| 6,181,400 | B1 | * | 1/2001 | Yang et al. ................. 349/117 |
| 7,149,173 | B2 | * | 12/2006 | Lehureau ..................... 369/94 |
| 7,167,230 | B2 | * | 1/2007 | Klaus et al. ................. 349/202 |
| 2003/0071995 | A1 | | 4/2003 | Kurata et al. |

OTHER PUBLICATIONS

Moreau, O. et al., "Fast and accurate measurement of liquid crystal tilt bias angle with Eldim EZContrast system", Proceedings of the SPIE-The International Society for Optical Engineering SPIE-INT., vol. 3826, pp. 236-241, XP002443518, (1999).

Birecki, H. et al. "Accurate Optical Measurement Of Small Tilt Angles In Thin Twisted Nematic Layers", Physics and Chemistry of Liquid Crystal Devices, Proceedings of the Symposium, pp. 115-123, XP008081543, (1980).

* cited by examiner

METHOD OF DETERMINING THE PRETILT ANGLE IN A LIQUID-CRYSTAL CELL

FIELD OF THE INVENTION

The present invention relates to a method of measuring the pretilt angle or inclination of the liquid-crystal molecules in TN (twisted nematic) liquid-crystal cells.

DISCUSSION OF THE BACKGROUND

A TN liquid-crystal cell is usually formed from two transparent substrates joined together to form between them a cavity into which the liquid-crystal molecules are injected. A liquid-crystal molecule has a shape elongate along a longitudinal axis, such as a rod. The pretilt angle can then be defined as follows: a normal position of such a molecule, flat against the surface plane of a substrate, is considered; one end of the molecule is anchored on this plane; and the other end is forced into a position such that the longitudinal axis of the molecule makes an angle with the surface plane of the substrate—this is the pretilt angle.

This angle notably makes it possible to impose the helical rotation direction on the liquid-crystal molecules of the cell through the thickness of the cavity and has a direct impact on the performance of a liquid-crystal cell. It is obtained in a well-known manner by depositing, on each of the faces of the substrates internal to the cavity, a transparent alignment layer, typically a polyimide layer, which is for example rubbed by means of a fabric roller along a defined orientation axis, so as to create anchorage lines on the surface along this axis and which is subjected to various cleaning and thermal annealing treatments. The rubbing operations carried out on the two substrates and their adjoining are such that a twist angle exists between the rubbing axes of the two alignment layers. For example, this twist angle is 90° or $\pi/2$ rad. Maybe lower, for example 80°, or higher, for example 280°, typically for what are called STN (super twisted nematic) liquid crystals. Hereafter, the expression "TN liquid crystal" is understood for any twist angle.

The liquid-crystal molecules all have the defined angle of inclination at rest, called the pretilt angle, relative to the plane of the substrate. When an electric field is applied, a helical rotation direction of the liquid-crystal molecules is imposed through the thickness of the cavity. The rubbing axes of the two alignment layers in the assembled cell define the top position and bottom position of the cell in a display, these being notions associated with the contrast values at the viewing angle.

The effective pretilt angle obtained at the end of manufacture depends on various factors, a number of which may be mentioned here: the alignment layer rubbing conditions; the cleaning steps; the topography of each of the substrates; the material or materials (polyimides) used to produce the alignment layers; the properties of the liquid crystals injected; etc.

Notably, the topographies of the two substrates are different. Typically, taking for example a liquid-crystal display comprising an active-matrix cell and color filters, a first substrate corresponds to the active matrix, which notably comprises TFT transistors, select lines, data lines and the first pixel electrodes of the screen, and a second substrate corresponds to the back electrode forming the other pixel electrode common to all the pixels, and also comprises red, green and blue color filters. The array of filters on the substrate 2 and the TFT array with the pixel electrodes on the substrate 1 give very different substrate topographies. Owing to these different topographies of the two substrates, the pretilt angle of the cell depends on that point on the surface where it is observed. In practice, the pretilt angle of a cell is an average value. This is because the value of this angle may be different on one substrate from that on the other. It may vary along the three dimensions, that is to say, considering a molecule, the angle may vary on the position of this molecule in the plane of the substrates and through the thickness of the cavity. If any step or steps in the manufacturing process are defective, it will be understood that this will have a direct impact on the pretilt angle of the cell and consequently on the quality of the display.

In the invention, if the display defects are observed at the end of manufacture during the test and measurement phase on the cell, for example if streaking, light leakage or angle contrast defects are observed, it will be desirable to check the average value of the pretilt angle of the cell in order to rapidly identify, as the case may be, one or more of the manufacturing process phases responsible for the observed defect or defects: contamination, obsolescence or defects in the polyimide, error in the rubbing operation.

Usually, the pretilt angle measurement is used in the procedure for developing new manufacturing processes or processes using a new material. Within this development context, the measurement is carried out by means of a well-known method, called the rotating-crystal method described by T. J. Scheffer and J. Nehring. This method uses specially manufactured cells. These cells may be immersed in liquid of matched index so as to eliminate Fresnel reflections, thereby enabling the precision of the measurement to be improved.

This measurement method is very suitable for cells that are specially designed for it, which are simplistic assemblies adapted to the parameter that it is desired to characterize. However, it cannot be used to test defective liquid-crystal screens at the end of manufacture. It is not suitable for measuring a pretilt angle in a cell but is a true product finished in all its complexity on leaving the production line.

In the invention, a solution to this technical problem is proposed by means of a method that does not require the production of special cells and can be readily used directly on liquid-crystal cell production lines.

According to the invention, an average value of the pretilt angle of a liquid-crystal cell is determined, notably by comparing a transmission measurement at an angle in a plane defined by the tested cell with a calculated theoretical value. More precisely, to determine the tilt angle in a twisted nematic liquid-crystal cell, the transmission of the cell is calculated as a function of the angle of incidence $\alpha$ for a light beam of given wavelength $\lambda$ using apparent values of the thickness d of the cell cavity, of the extraordinary index ne and of the twist angle $\theta_{twist}$, in order to obtain a plurality of simulation curves, one per pretilt angle. The transmission curve is measured as a function of the angle of incidence of the cell along the YY' axis passing through the top T and bottom B positions of the cell, for the light beam of wavelength $\lambda$, using a contrast meter. The coincidence of this measurement curve with one of the plurality of simulation curves gives the pretilt angle of this cell.

The invention therefore relates to a method of determining a pretilt angle in a liquid-crystal cell, said cell comprising a cavity between two substrates containing liquid-crystal molecules, each face of the substrates inside the cavity comprising an alignment layer such that the liquid-crystal molecules are each inclined to the plane of the substrates by said pretilt angle, said liquid crystal being of the twisted nematic type with a defined twist angle, and said cell having a top position and a bottom position which define a vertical mid-axis when viewed from the front. The method includes use of a contrast meter for establishing a measurement curve, along said vertical axis of the cell, for the transmission of a light beam at a defined wavelength of said cell as a function of the angle of incidence of a light beam on said cell, and a comparison of said measurement curve with a plurality of simulation curves for the transmission of said cell as a function of the angle of incidence of the light beam along said vertical axis of the cell, each of said plurality of simulation curves being calculated for a defined pretilt value and said plurality of curves being calculated by taking apparent values of the thickness d of the liquid-crystal cavity between the two substrates, of the extraordinary index ne of the liquid crystals and of the twist angle of the cell which are determined by the following formulae:

$$d_{app} = \frac{d}{\cos(\gamma)};$$

$$ne_{app} = \frac{ne}{\sqrt{1 + \left(\frac{ne^2}{no^2} - 1\right)\sin(\gamma - \theta_{tilt})}};$$

$$\theta_{twist-a} = 2 \cdot \text{Arctan}\left(\frac{1}{\cos(\gamma)}\right)$$

where γ is the transmission angle of the light beam in the liquid crystal, which depends on the angle of incidence, no is the ordinary index of the liquid crystals, d is the thickness of the cavity and ne is the extraordinary index at normal incidence.

The determination of the pretilt angle of said cell is given by selecting a simulation curve from said plurality of curves that coincide substantially with said measurement curve.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention.

Accordingly, the drawings and description thereof are to be regarded as illustrative in nature, and not as restrictive.

DESCRIPTION OF PREFERRED EMBODIMENTS

In the description that follows, it should be noted that the various elements are each denoted by the same reference in all the figures.

The invention applies in general to liquid-crystal cells of the twisted nematic or TN type having a passive or active matrix and with or without color filters. The invention is more particularly described for a twist angle of 90° (π/2 rad), but it applies in general irrespective of the value of the twist angle.

Figure 1A:
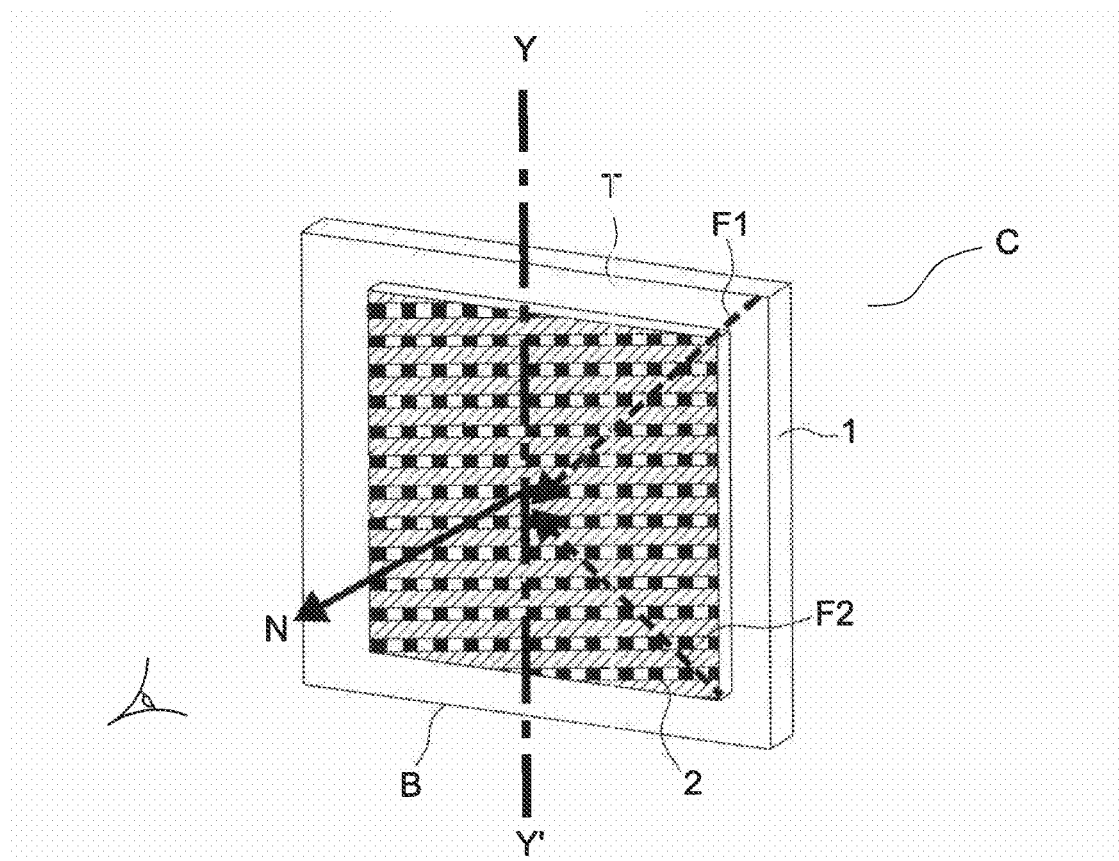
FIGS. 1a and 1b illustrate, in front view and in cross-sectional view, a liquid-crystal cell display of the active matrix type with color filters.
Figure 1B:
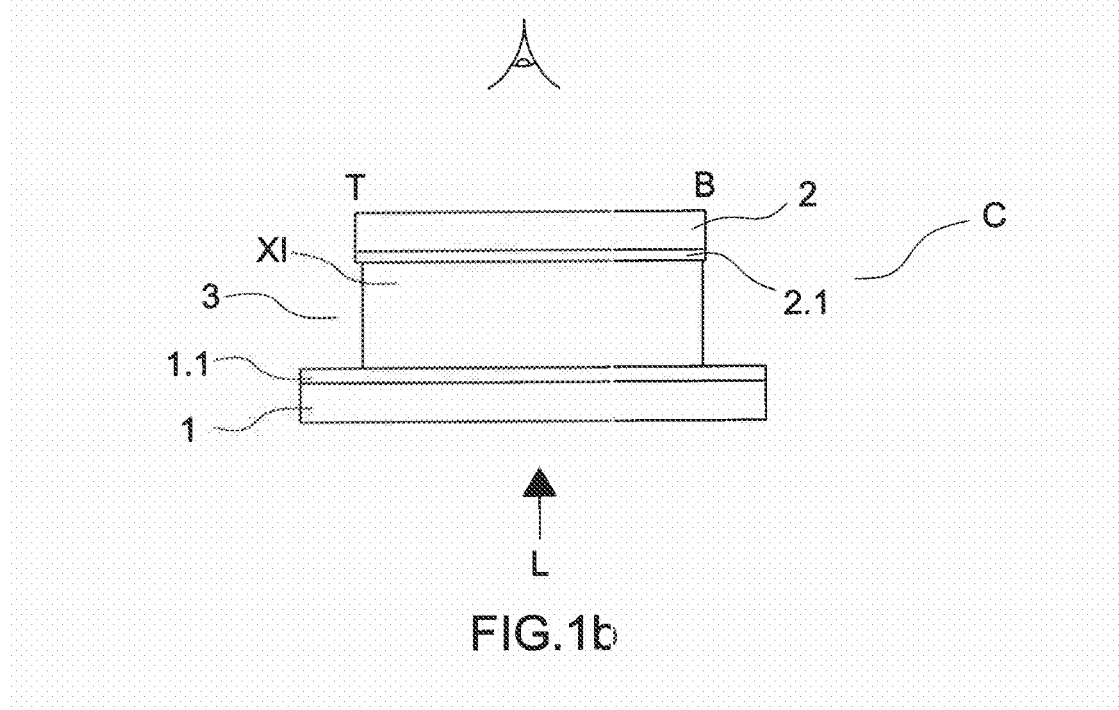
Figure 2A:
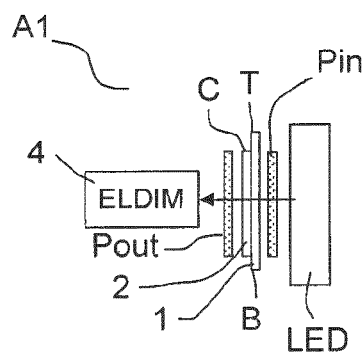
FIGS. 2a to 2d illustrate the contrast meter setups used in the invention to measure the response of a cell in transmission.
Figure 2B:
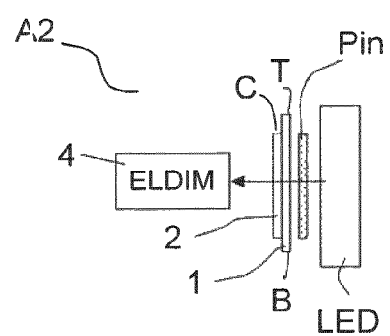
Figure 2C:
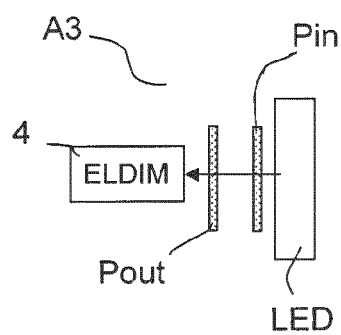
Figure 2D:
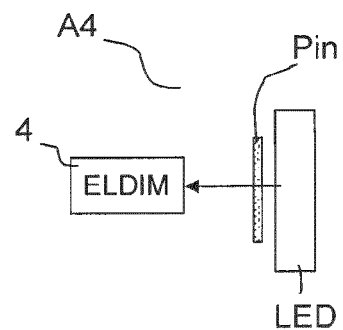

As a simple illustration, FIGS. 1a and 1b illustrate an active-matrix liquid-crystal cell with color filters, to which the invention may be applied.

FIG. 1a is a front view and FIG. 1b a cross-sectional view. They illustrate a conventional structure of a cell C: two transparent substrates 1 and 2 joined together so as to form a cavity 3 into which the liquid crystals XI are injected. The substrate 1 is the one that includes the pixel electrodes and associated switching devices for addressing, typically TFTs in the case of an active matrix. The substrate 2 is the one that includes the back electrode common to all the pixels of the cell. It should be noted that, in the case of a passive-matrix cell, there would not be a common back electrode but an array of pixel electrodes and associated switching devices. The substrate 2 also includes an array of color filters, illustrated symbolically in the figure by a black-and-white checkerboard. Each substrate is covered on the cavity side with a rubbed alignment layer, typically a polyimide layer, namely the layer 1.1 and layer 2.1 of the substrate 1 and the substrate 2 respectively. The rubbing direction on each layer 1.1, 2.1 is indicated in the figures by a corresponding arrow, F1 and F2 respectively. In practice, the substrate 1 receives the incident radiation L to be transmitted by the cell.

As is known, the directions of the rubbing axes F1 and F2 with respect to each other in the assembled cell determine the top T and bottom B positions of the cell, as the cell has to be positioned in a display seen from the front. The positions T and B are indicated in these figures and the following figures. In practice, these positions define, on a display, a vertical mid-axis YY' of the cell seen from the front, typically on the surface plane of the substrate 2 (FIGS. 1a and 1b).

FIGS. 2a to 2d and 3 illustrate steps in a first phase of a method of determining the tilt angle of a liquid-crystal cell C of any type, for example an active-matrix cell with color filters as is described above in relation to FIGS. 1a and 1b.

In this phase, the transmission of the cell is measured by means of a commercial contrast meter 4, which delivers luminance measurements received at each point simultaneously for various angles of incidence α of the light beam striking the surface plane of the substrate 1. The optical figures delivered by the contrast meter show corresponding contrast maps or isocontrast plots. An ELDIM-EZ contrast meter, sold by ELDIM S. A., may for example be used.

Two series of two measurements are carried out by means of a display device in four configurations A1 to A4 illustrated in FIGS. 2a to 2d.

The first two configurations A1 and A2 are contrast measurements of the cell when the display device is intended to block off the light (configuration A1) or lets through all the light (configuration A2), respectively. More precisely in configuration A1, the display device comprises the light box LED, an input polarizer $P_{in}$, the cell C and an output polarizer $P_{out}$. The cell is lit via the rear face of the substrate 1. The polarizers $P_{in}$ and $P_{out}$ have parallel polarizations and the cell is used with no voltage applied. Under these conditions, taking for example a TN liquid-crystal cell C, the polarization of the light undergoes a π/2 rotation upon passing through the liquid-crystal cavity. Since the output polarizer is identical to the input polarizer, the light polarized along a different axis does not pass through the output polarizer. In this configuration A1, a transmission measurement is taken for the "dark" state. To take the transmission measurement in the "bright" state (with all the polarized light passing therethrough), all that is required is to remove the output polarizer $P_{out}$ from the previous configuration A1. This is configuration A2 illustrated in FIG. 2b.

Figure 3:
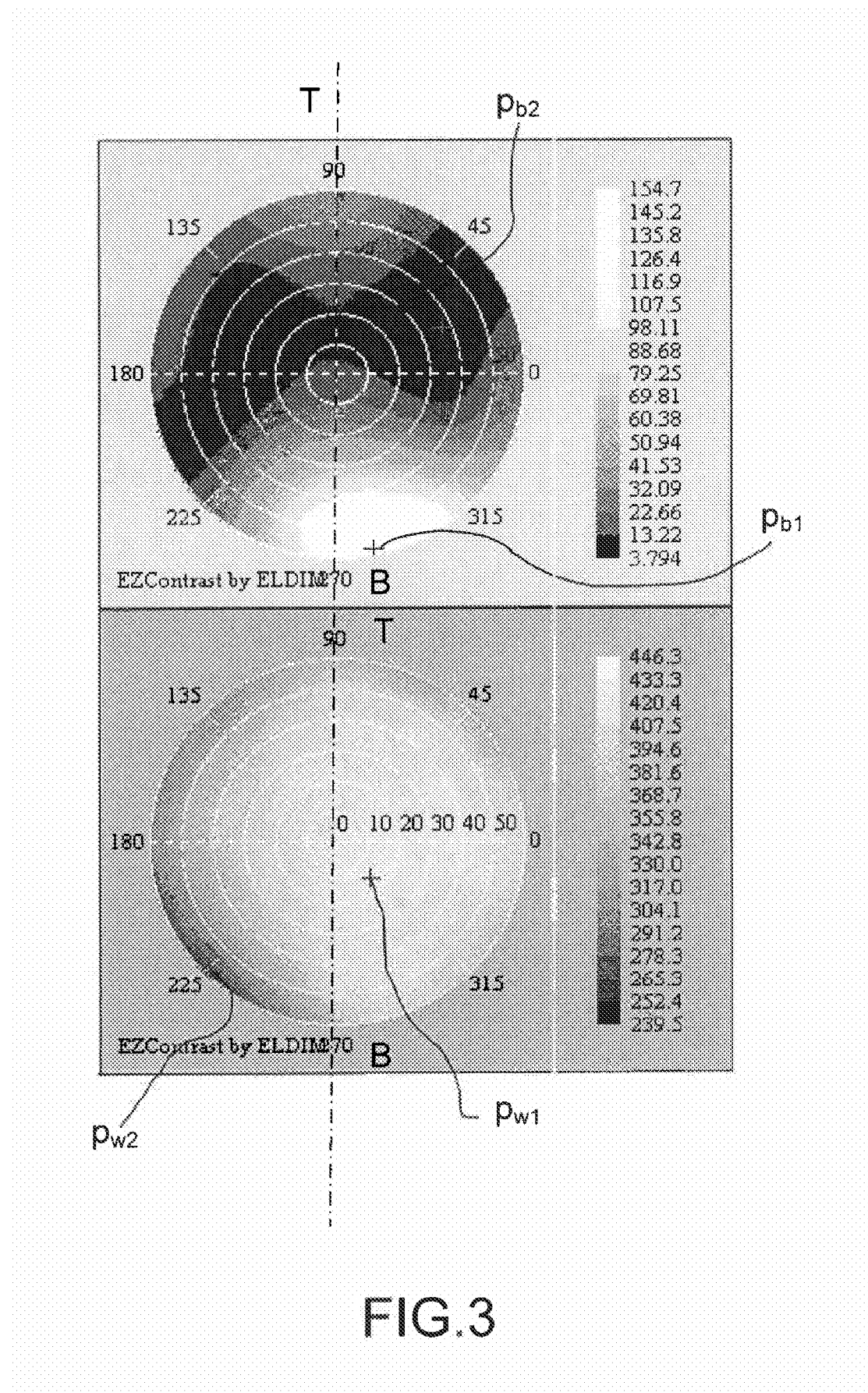
FIG. 3 gives an example of the optical images showing the response in the bright state and in the dark state of a cell that are obtained with a setup for measuring the contrast as a function of the angle of incidence.

FIG. 3 shows an example of the optical images obtained for the dark state (Mb) and for the bright state (Mw). The total transmission T of the cell is obtained by taking the ratio of the two values, for all points located on the vertical section Y and Y', i.e. between the top T and bottom B of the cell. The pattern indexed from 0 at the center to 60 on the outer circle gives the angle of incidence (or angle of observation) α. The angle of orientation φ, which varies from 0° to 360° clockwise, enables the observed brightness variations to be identified. Of more particular interest are the observed variations along the vertical axis YY' (90°-270°) corresponding to the top T and bottom B positions of the screen. The contrast map thus shows the observed variation along this axis, by varying the angle of observation from −60° (for φ=270°) to +60° (for φ=90°). Observed at the center 0 of the pattern is the contrast at normal incidence N on the surface of the substrate 1 (FIG. 1a), i.e. with an angle of incidence α=0° to the normal N.

In the example, in the dark state a concentrated butterfly-shaped dark area offset from the central point is observed. In the dark state, there is lower brightness at the highest angles of incidence.

The transmission of the cell as a function of the angle of incidence is obtained by taking the ratio at each point of the brightnesses obtained between the "dark" state and "bright" state, for incident radiation at a given wavelength.

However, this transmission must be corrected for the actual contribution of the output polarizer $P_{out}$. This is because the transmission in the polarizer varies in practice with the angle of incidence. The transmission of the polarizer is measured using the same principle as above, that is to say with and without the output polarizer $P_{out}$, but without the cell, and at the same wavelength. These are configurations A3 and A4 illustrated in FIGS. 2c and 2d.

Figure 7:
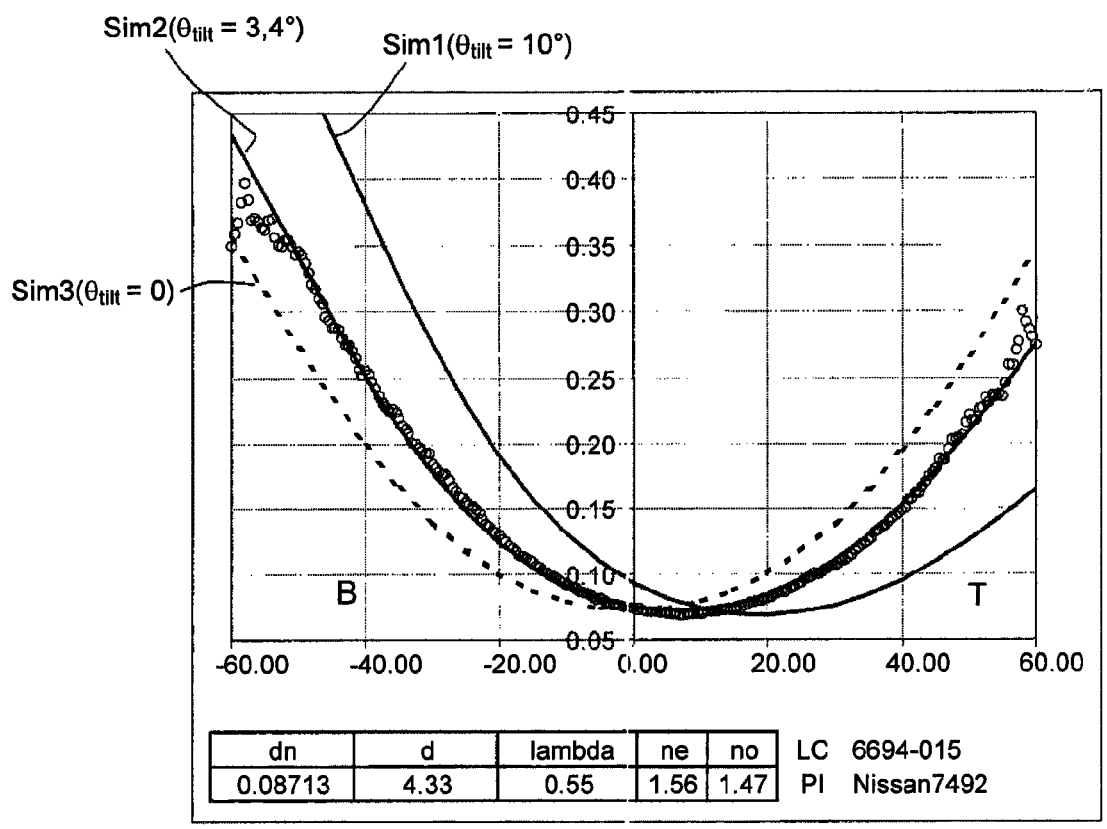
FIGS. 7 and 8 illustrate a method of comparing the measurement of the transmission based on contrast measurements and the approximate theoretical curves for this response, making it possible to determine the average value of the pretilt angle of a cell.
Figure 8:
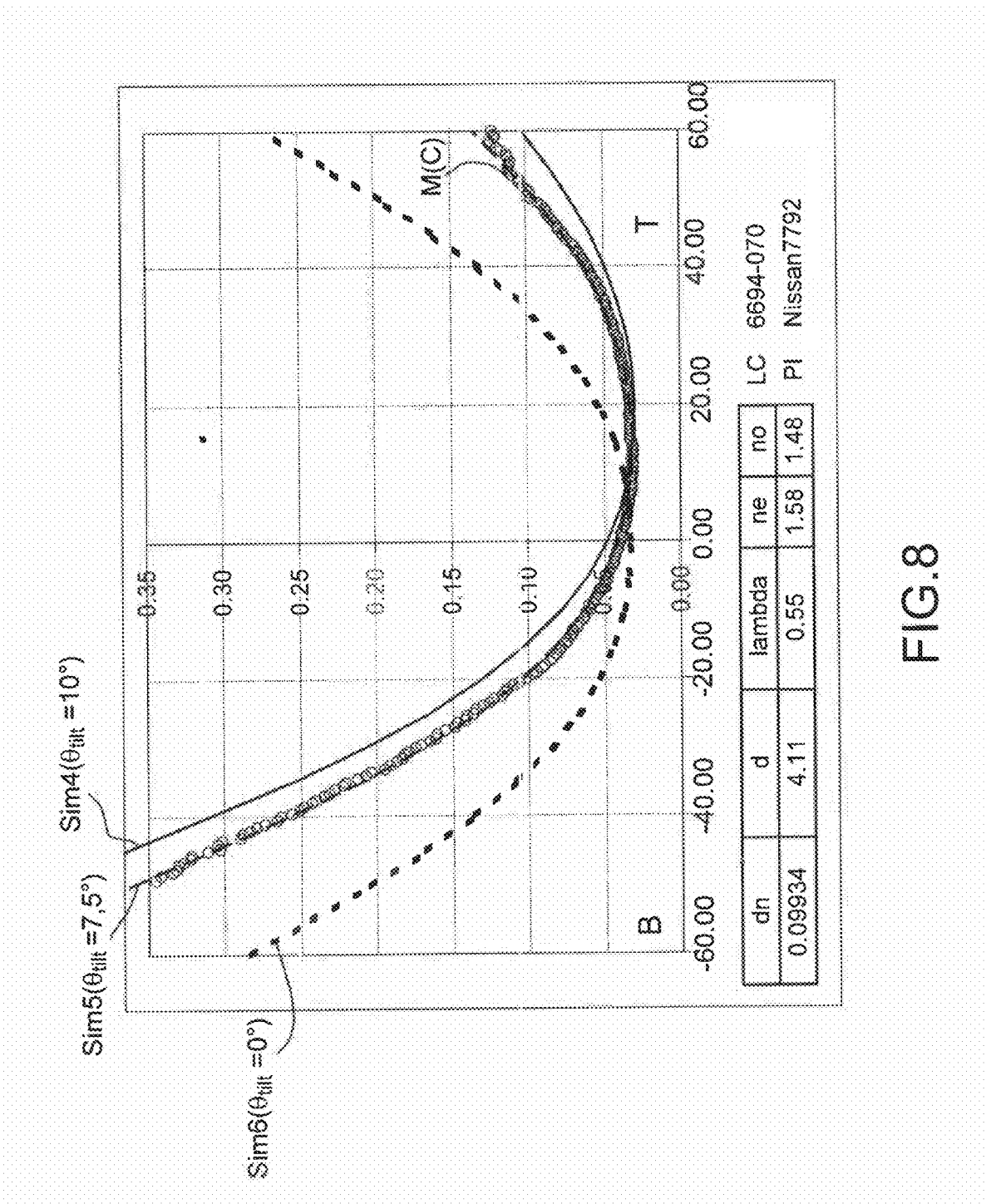

Thus, in this phase of the method of the invention, after the brightness maps relating to configurations A1 to A4 have been recorded, the brightness values at each of the points of the straight line portion [T; B] are recorded as a function of the angle of incidence relative to the normal. For each of the points, the (dark state/bright state) ratio obtained for the cell at this point is taken and is divided by the (dark state/bright state) ratio obtained at this same point for the output polarizer $P_{out}$. A transmission curve M(C) is obtained as a function of the angle of incidence α, as illustrated in FIGS. 7 and 8, with α varying from −60° to +60°.

It should be noted that the transmission for the polarizer is measured just once for a particular defined output polarizer. This measurement can be repeated only if the output polarizer needs to be changed.

FIGS. 4 to 8 illustrate another phase of the method, which may be carried out in parallel, before or after the phase of measuring the transmission of the cell C as a function of the angle of incidence. This other phase is essentially a theoretical calculation of the transmission T as a function of the angle of incidence along the vertical axis between the top position T and the bottom position B of the cell. In this phase, the general theoretical formula of M. H. L. Ong giving the transmission of the cell for normal incidence, i.e. for α=0° is used. This formula, well known to those skilled in the art, is the following:

$$T = \cos^2(\theta_{twist}) + \frac{1}{2v}\sin(2v \cdot \theta_{twist})\sin(2\theta_{twist}) - \left(\frac{1}{v}\sin(v \cdot \theta_{twist})\right)^2 \cos(2\theta_{twist}) \text{ with}$$
$$v = \sqrt{1+u^2} \text{ and}$$
$$u = \frac{\pi \cdot d \cdot \Delta n}{\lambda \cdot \theta_{twist}} \text{ and}$$
$$\Delta n = \frac{ne}{\sqrt{1+\left(\frac{ne^2}{no^2}-1\right)\sin(\theta_{tilt})}} - no$$

Eq. 1

In this formula, λ represents the wavelength of the incident radiation, $\theta_{twist}$ the twist angle, d the thickness of the liquid-crystal cavity between the two substrates 1 and 2, and no and ne the ordinary and extraordinary indices characteristic of the liquid crystals used.

The formula given by Eq. 1 is however not valid for any non-normal incidence. In the case of a non-normal incidence, there is, as illustrated in FIG. 4, a refraction in the various media through which the light passes, depending on the index differences between the media, thereby modifying the apparent value of certain characteristics and consequently the transmission.

Figure 4:
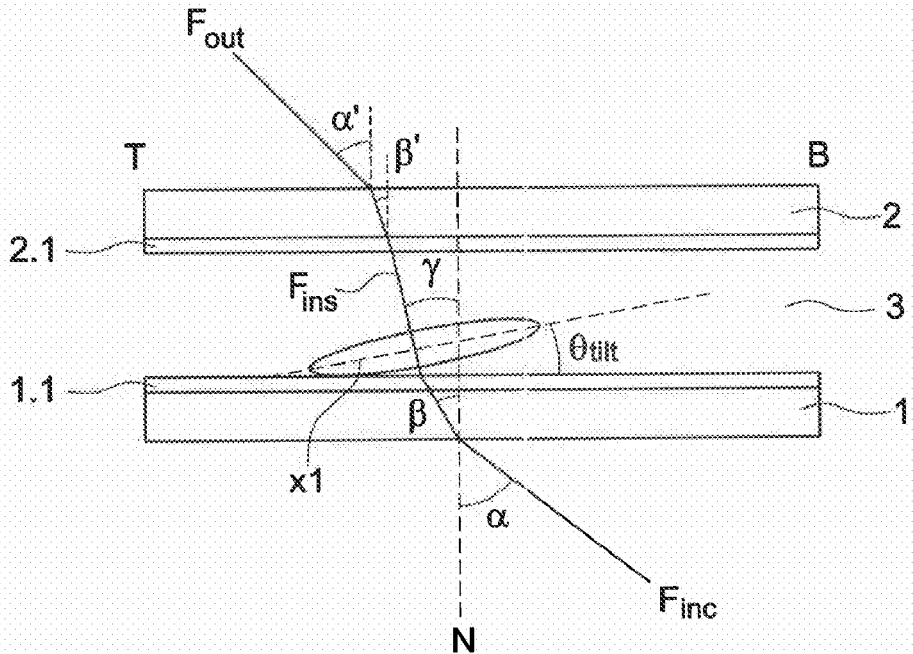
FIG. 4 illustrates the angles of incidence and angles of refraction in the cell of a light ray.

FIG. 4 shows a liquid crystal molecule xl. As is known, it has an elongate shape, and the longitudinal axis of this molecule makes a pretilt angle $\theta_{tilt}$ with the surface plane.

An incident light beam $F_{inc}$ strikes the rear face of the substrate 1 at an angle of incidence α≠0° to the normal N on this face. It passes through the substrate 1, making an angle β to the normal. In the liquid-crystal cavity 3, the ray $F_{ins}$ obtained makes an angle γ to the normal. It passes through the substrate 2, making an angle β' with the normal and emerges ($F_{out}$) making an angle α' to the normal.

Let us consider a twisted nematic liquid crystal such that the rotation direction of the helix is to the right.

Figure 5:
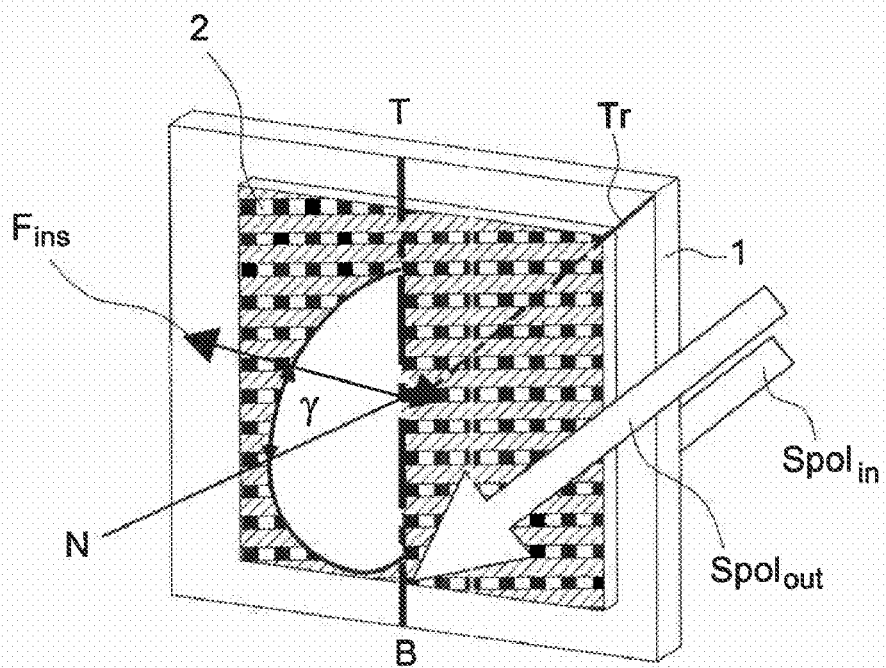
FIG. 5 illustrates the path of the angle of refraction γ of the light beam in the liquid-crystal cavity as a function of the angle of incidence α of the beam on the cell.
Figure 6:
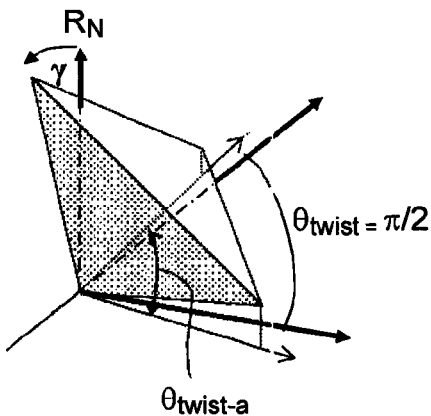
FIG. 6 is a diagram illustrating the variation in the twist angle with the angle of incidence α, relative to normal incidence with respect to the surface plane of the cell.

As illustrated in FIG. 5, by varying the angle of incidence α of the light beam $F_{inc}$, there is a variation in the angle γ of the beam $F_{ins}$ in the cavity. This variation has an influence on the extraordinary index ne, the twist angle and the thickness of the cell.

The idea of the invention is to approximate the apparent value of these parameters, by equations as a function of the angle of incidence α, in order to obtain an approximate value of the transmission as a function of the angle of incidence α starting from the formula Eq. 1 indicated above.

In the invention, the following approximations are made: For the extraordinary index ne, it may be shown that the apparent value $ne_{app}$ of this index as a function of the angle of incidence may be expressed as:

$$ne_{app} = \frac{ne}{\sqrt{1 + \left(\frac{ne^2}{no^2} - 1\right)\sin(\gamma - tilt)}},$$

which leads to an apparent value $\Delta n_{app}$ of the difference between the extraordinary and ordinary indices, which is expressed as: $\Delta n_{app} = ne_{app} - no$. It may be shown that the apparent value of the twist angle is also modified, this being illustrated in FIG. 6 for a set twist angle of $\pi/2$ at normal incidence. The refraction axis $R_N$ in a TN liquid crystal corresponding to normal incidence is considered. In this case, the twist angle $\theta_{twist}$ is $\pi/2$. If this angle is shifted by an angle $\gamma$, toward the rear in the example, the apparent twist angle is different—in the example, it is larger.

It may be shown that this apparent twist angle $\theta_{twist-a}$ may be expressed as a function of the angle of refraction $\gamma$ in the liquid crystal as:

$$\theta_{twist-a} = 2 \cdot \text{Arctg}\left(\frac{1}{\cos(\gamma)}\right)$$

The apparent value $d_{app}$ of the cavity thickness $d$ may be expressed as:

$$d_{app} = \frac{d}{\cos(\gamma)}.$$

It may be shown that the relationship between the angles $\alpha$ and $\gamma$ may be approximated by considering that the refractive index for the liquid crystal in the vertical section (along YY') may be approximated by the apparent value of the extraordinary index, thereby giving:

$$\gamma \approx \arcsin\left(\frac{1}{ne_{app}}\sin(\alpha)\right).$$

From this may be deduced a formula for approximating the transmission as a function of the angle of incidence, using these apparent values $T(\alpha)$, and by replacing, in the formula Eq. 1, ne, $\theta_{twist}$, and d by their apparent values, i.e.:

$$T(\alpha) = \cos^2(\theta_{twist-a}) + \frac{1}{2v}\sin(2v \cdot \theta_{twist-a})\sin(2\theta_{twist-a}) - \left(\frac{1}{v}\sin(v \cdot \theta_{twist-a})\right)^2 \cos(2\theta_{twist-a})$$

with $$v = \sqrt{1 + u^2} \text{ and}$$

$$u = \frac{\pi \cdot d_{app} \cdot \Delta n_{app}}{\lambda \cdot \theta_{twist-a}} \text{ and}$$

$$\Delta n_{app} = \frac{ne}{\sqrt{1 + \left(\frac{ne^2}{no^2} - 1\right)\sin(\gamma - \theta_{tilt})}} - no$$

For a given cell, d, ne and no, which are manufacturing parameters, are known.

In practice, d is measured using a conventional rotating-polarizer device and can be adjusted in order to improve the coincidence between the theoretical simulated curves and the measurements. The value of d at normal incidence is varied through the thickness of the cavity, and the value for which the best coincidence is obtained between the simulation curve calculated with this value and the measurement curve gives the value of the cell thickness. The method according to the invention thus advantageously makes it possible to determine both the pretilt angle and the thickness of the cell tested.

$\lambda$ is taken to be the value used for measuring the response of the cell in the preceding phase with a contrast meter.

Then, for a given pretilt angle $\theta_{tilt}$, a corresponding curve $T(\alpha)$ for example for $\alpha$ varying from $-60°$ to $+60°$ may be simulated.

In practice, and because the angle $\beta$ is close to the angle $\gamma$, it is advantageous to make the approximation $\gamma \approx \beta$ in the formula giving the apparent value of the extraordinary index, i.e.:

$$ne_{app} \approx \frac{ne}{\sqrt{1 + \left(\frac{ne^2}{no^2} - 1\right)\sin(\beta - \vartheta_{tilt})}}$$

This approximation allows the number of iterations for calculating T for each value $\alpha$ to be reduced.

FIGS. 7 and 8 illustrate the curves measured for radiation at $\lambda = 550$ nm, and the simulated curves calculated for this same wavelength, for various pretilt angles for various cells.

Each time, the pretilt angle of the cell C is deduced from the coincidence between the measured curve and a given simulated curve.

More precisely, FIG. 7 relates to a cell defined notably by a liquid crystal with the reference 6694-015, and alignment layers made of polyimide PI with the reference NISSAN7492, by means of which a small pretilt angle is obtained, typically between 3° and 4°. The typical values of d, ne, no and dn=n0−ne for this cell are indicated in the figure. Four simulation curves Sim1 to Sim4 were calculated in this example for four different pretilt angles. Coincidence is achieved between the measured curve M(C) and the simulated curve Sim2 calculated for a pretilt angle $\theta_{tilt} = 3.4°$, thereby determining this angle for the cell in question.

FIG. 8 relates to a cell defined notably by a liquid crystal with the reference 6694-070, and alignment layers made of polyimide PI with the reference NISSAN7792, by means of which a pretilt angle larger than in the previous case is obtained, typically between 6° and 8°. The typical values of dn, d, ne and no for this cell are indicated in the figure.

In this second example, three simulation curves Sim4 to Sim6 were calculated for three different pretilt angles. Coincidence is achieved between the measured curve M(C) and the simulated curve Sim5 calculated for a pretilt angle $\theta_{tilt} = 7.5°$, thereby determining this angle for the cell in question.

In practice, although the measured curve M(C) does not correspond exactly with a simulated curve, all that is required is to vary the value of d slightly since this value has a large effect on the transmission. The typical value d for the manufacturing process for the cell in question is given with a tolerance range.

For example, in the case of the example shown in FIG. 5, the thickness d of the cavity was measured, giving a value of 4.35 µm, whereas the typical value d given for the process, and used to calculate the simulated curves Sim1 to Sim4, was d=4.33 µm as indicated in the figure.

In practice, by varying the value of d, the simulated curve is shifted along the vertical axis. By varying the pretilt angle, and as may be seen in FIGS. 7 and 8, the simulated curves pass from a symmetrical shape, at 0 with respect to the vertical axis, to unsymmetrical shapes.

The determination method that has just been described is simple to implement and has in practice shown good repeatability and sufficient precision, better than 0.5°. This is sufficient to detect a major problem in the manufacturing process or in the polyimide materials used. The method is used each time that a display defect is observed on a liquid-crystal after manufacture.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:

1. A method of determining a pretilt angle $\theta_{tilt}$ in a liquid-crystal cell, said cell including a cavity between two substrates containing liquid-crystal molecules, each face of the substrates inside the cavity including an alignment layer such that the liquid-crystal molecules are each inclined to the plane of the substrates by said pretilt angle, said liquid crystal being of the twisted nematic type with a defined twist angle $\theta_{twist}$, and said cell having a top position and a bottom position which define a vertical mid-axis when viewed from the front, the method comprising:

using contrast meter for establishing a transmission measurement curve, along said vertical axis of the cell, for transmission of a light beam at a defined wavelength $\lambda$ of said cell as a function of the angle of incidence $\alpha$ of a light beam on said cell, and comparing said measurement curve with a plurality of simulation curves for the transmission of said cell at the same wavelength $\lambda$ as a function of the angle of incidence of the light beam along said vertical axis of the cell, each of said plurality of simulation curves being calculated for a defined pretilt value and said plurality of simulation curves being calculated by taking apparent values of the thickness d of the liquid-crystal cavity between the two substrates, of the extraordinary index ne of the liquid crystals and of the twist angle $\theta_{twist}$ of the cell which are determined by the following formulae:

$$d_{app} = \frac{d}{\cos(\gamma)};$$

$$ne_{app} = \frac{ne}{\sqrt{1 + \left(\frac{ne^2}{no^2} - 1\right)\sin(\gamma - \theta_{tilt})}};$$

$$\theta_{twist-a} = 2 \cdot \text{Arctan}\left(\frac{1}{\cos(\gamma)}\right)$$

in which $\gamma$ is the transmission angle of the light beam in the liquid crystal, which depends on the angle of incidence $\alpha$, no is the ordinary index of the liquid crystals, d is the thickness of the cavity and ne is the extraordinary index at normal incidence.

2. The method as claimed in claim 1, wherein the determining the pretilt angle of said cell is given by selecting a simulation curve from said plurality of curves that coincide substantially with said measurement curve.

3. The method as claimed in claim 2, wherein the coincidence is obtained by varying the thickness of the cavity at normal incidence, from the calculation of said plurality of simulation curves in order to obtain a cavity thickness d for which the best coincidence is obtained.

4. The determination method as claimed in claim 2, wherein the apparent value of the extraordinary index is taken as the value obtained by the following formula:

$$ne_{app} = \frac{ne}{\sqrt{1 + \left(\frac{ne^2}{no^2} - 1\right)\sin(\theta_{tilt} - \beta)}}$$

where $\beta$ is the angle of transmission of the beam of angle of incidence $\alpha$ in the substrate 1 receiving the incident beam to be transmitted.

5. The method as claimed in claim 1, wherein the establishing the transmission measurement curve as a function of the angle of incidence comprises a first contrast measurement and a second contrast measurement on said cell at a bright state and dark state respectively, and the ratio of the two measurements along the vertical axis, said first measurement being obtained by placing said cell in a display device including a light box emitting radiation at said defined wavelength, said cell being placed for the first measurement between an input polarizer and an output polarizer with parallel polarizations, the second measurement being carried out by removing said output polarizer from the display device.

6. The method as claimed in claim 5, wherein the establishing said measurement curve further includes a correction of said ratio by the transmission of said output polarizer, obtained by taking a first contrast measurement and a second contrast measurement on said output polarizer in a bright state and dark state respectively, and the ratio of the two measurements along the vertical axis, said first measurement being obtained with a display device including a light box emitting radiation in said defined wavelength, said input polarizer and said output polarizer, the second measurement being taken by removing said output polarizer from the display device.

7. The method as claimed in claim 1, wherein said simulation curves are obtained by the following transmission curve for a light beam with an angle of incidence $\alpha$ normal to the plane of the cell, as a function of the pretilt angle $\theta_{tilt}$:

$$T = \cos^2(\theta_{twist}) + \frac{1}{2v}\sin(2v \cdot \theta_{twist})\sin(2\theta_{twist}) - \left(\frac{1}{v}\sin(v \cdot \theta_{twist})\right)^2 \cos(2\theta_{twist})$$

with $$v = \sqrt{1 + u^2} \quad \text{and}$$

$$u = \frac{\pi \cdot d \cdot \Delta n}{\lambda \cdot \theta_{twist}} \quad \text{and}$$

$$\Delta n = \frac{ne}{\sqrt{1 + \left(\frac{ne^2}{no^2} - 1\right)\sin(\theta_{tilt})}} - no$$

$\lambda$ being the wavelength of the incident radiation, $\theta_{twist}$ being the twist angle, $v=2\pi\lambda$, and d being the thickness of the liquid-crystal cavity between said first and second substrates, by replacing in this formula the apparent values of the thickness d, of the extraordinary index ne, and of the twist angle $\theta_{twist}$ as a function of said angle of incidence $\alpha$.

8. The method as claimed in claim 1, applied for detecting a pretilt angle defect in a liquid-crystal cell.

9. The method as claimed in claim 1, applied for measuring a cavity thickness in a liquid-crystal cell.

* * * * *